United States Patent [19]

Raythatha et al.

[11] Patent Number: 4,816,074
[45] Date of Patent: Mar. 28, 1989

[54] KAOLINITE AGGREGATION USING SODIUM SILICATE

[75] Inventors: Rasik H. Raythatha, Tennille; E. Wayne Andrews, Sandersville, both of Ga.

[73] Assignee: E.C.C. America Inc., Atlanta, Ga.

[21] Appl. No.: 149,638

[22] Filed: Jan. 28, 1988

Related U.S. Application Data

[63] Continuation-in-part of Ser. No. 754,475, Jul. 12, 1985, abandoned, and a continuation-in-part of Ser. No. 802,843, Nov. 27, 1985, abandoned, and a continuation-in-part of Ser. No. 918,632, Oct. 14, 1986, and a continuation-in-part of Ser. No. 1,889, Jan. 8, 1987.

[51] Int. Cl.$^4$ ............... C04B 14/00; C04B 33/04; C09C 3/00; D21F 1/00
[52] U.S. Cl. ...................... 106/468; 106/84; 106/486; 501/146; 501/147; 501/150; 501/148; 427/391; 427/361; 428/537.5; 428/688; 428/446; 162/135; 162/181.6; 162/181.8; 162/181.7; 162/181.4

[58] Field of Search ............... 106/288 B, 309, 308 C, 106/308 B, 308 Q, 308 P, 308 M, 308; 501/146, 147, 150; 427/391, 361; 428/537.5, 688, 446; 162/135, 181.6, 181.8, 181.7, 181.4

[56] References Cited

U.S. PATENT DOCUMENTS

| | | | |
|---|---|---|---|
| 4,299,807 | 11/1981 | Angel et al. | 501/150 |
| 4,419,228 | 12/1983 | Cook et al. | 501/150 |
| 4,650,521 | 3/1987 | Kuppelman et al. | 501/147 |
| 4,738,726 | 4/1988 | Pratt et al. | 501/147 |

FOREIGN PATENT DOCUMENTS

1176466  8/1964  Fed. Rep. of Germany ... 162/181.6

Primary Examiner—Howard E. Schain
Assistant Examiner—Garnette D. Draper
Attorney, Agent, or Firm—Klauber & Jackson

[57] ABSTRACT

A process is described in which a structured aggregated kaolin pigment is prepared by mixing substantially dry kaolin in particulate form with an aqueous alkali metal silicate to deposit on the surface of the kaolin particles a substantially molecular level of said silicate without formation of silica gel, drying the treated kaolin without calcination and exposing it to an acidic gas. The product is useful as a pigment in the coating or filling of paper.

26 Claims, 6 Drawing Sheets

KAOLINITE AGGREGATION USING SODIUM SILICATE

This application is a continuation-in-part of U.S. Ser. No. 754,475 filed July 12, 1985, now abandoned; of U.S. Ser. No. 802,843, fied Nov. 27, 1985, now abandoned; of U.S. Ser. No. 918,632 filed Oct. 14, 1986 and of U.S. Ser. No. 001,889 filed Jan. 8, 1987.

FIELD OF THE INVENTION

This invention relates generally to kaolin products, and more specifically relates to a structured kaolin pigment and methods of manufacture of same. The pigment is useful as a filler in paper products and enables preparation of paper coating formulations which yield resultant coated paper products of surprisingly enhanced properties.

BACKGROUND OF THE INVENTION

In the course of manufacturing paper and similar products, including paperboard and the like, it is well known to incorporate quantities of inorganic materials into the fibrous web in order to improve the quality of the resulting product. In the absence of such "fillers", the resulting paper can have a relatively poor texture due to discontinuities in the fibrous web. The said fillers are also important in improving the printing qualities of the paper, i.e. by improving the surface characteristics of same. The use of appropriate such fillers, further, vastly improves the opacity and the brightness of a paper sheet of a given weight.

A number of inorganic materials have long been known to be effective for many of the aforementioned purposes. Among the best of these materials is titanium dioxide, which can be incorporated into the paper in the form of anatase or of rutile. Titanium dioxide, however, is among the most expensive materials which are so useable. Thus despite the effectiveness of such material as a filler, its use is limited and satisfactory replacements have been much sought after.

Among the materials which have found increasing acceptance as paper fillers are calcined kaolins. Materials of this type are generally prepared by calcining a crude keolin which may have been initially subjected to prior beneficiation steps in order to remove certain impurities, e.g. for the purpose of improving brightness in the ultimate product. Reference may usefully be had to Proctor U.S. Pat. No. 3,014,836, and to Fanselow et al, U.S. Pat. No. 3,586,823, which disclosures are representative of the prior art pertinent to calcined kaolins.

Those properties which render a kaolin pigment particularly valuable for use as a filler are also well known. These include a low abrasion value, and high brightness and opacifying characteristics. The low abrasion is significant in order to assure that the resultant paper product may be manufactured and processed using conventional machinery without damaging same. The brightness and opacifying characteristics are important in producing an acceptable paper sheet, one which incorporates whiteness, high opacity, good printability, and light weight.

Both the brightness characteristics of the given kaolin and the opacifying properties of same when incorporated as a filler in paper, may be quantitatively related to a property of the filler identified as the "scattering coefficient S". The said parameter, i.e. the scatterinag coefficient S of a given filler pigment, is a property well known and extensively utilized in the paper technology art, and has been the subject of numerous technical papers and the like. The early exposition of such measurements was made by Kubelka and Munk, and is reported in Z. Tech. Physik 12: 539 (1931). Further citations to the applicable measurement techniques and detailed definitions of the said scattering coefficient are set forth at numerous places in the patent and technical literature. Reference may usefully be had in this connection, e.g. to U.S. Pat. Nos. 4,026,726 and 4,028,173. In addition to the citations set forth in these patents, reference may further be had to Pulp and Paper Science Technology, Vol. 2 "Paper", Chapter 3, by H. C. Schwalbe (McGraw-Hill Book Company, N.Y.).

In order to obtain high light scattering and opacity, the major portion of filler should be in the range of one micrometer. However, good light scatter cannot be achieved solely by using a kaolin having the said size characteristics: an essential further characteristic needed is that the kaolin be structured, i.e., formed from an assemblage of platelets interconnected or bonded to provide aggregates which include a network of the platelets.

Aggregation can be of interest for additional reasons. In particular, many kaolin crude reserves are considerably finer than preferred by the paper industry; i.e., they have an unduly high proportion of particles with E.S.D.'s below 0.25 micrometers. Typical Cretaceous kaolins, e.g., include 25 to 30% by weight of particles below 0.25 micrometers; and typical Tertiary kaolins can include 50 to 60% by weight of particles below 0.25 micrometers E.S.D. (equivalent spherical diameter). The presence of such large quantities of very fine particles can have detrimental effects upon paper strength, and in other respects are undesired by the paper manufacturer. While the said extreme fines can be removed by various separation processes, such as high speed centrifuging, such removal is very expensive and entails high capital investment; this quite aside from the possible loss of high proportions of the input feed.

One method for achieving aggregation is to utilize calcining. Thus, in U.S. Pat. No. 4,381,948 to A. D. McConnell et al, a calcined kaolin pigment and a method for manufacture of same are disclosed. The said pigment consists of porous aggregates of kaolin platelets, and exhibits exceptionally high light scattering characteristics when incorporated as a filler in paper. This pigment, which substantially corresponds to the commercially available product ALPHATEX ® of the present assignee, E.C.C. America, Inc. (Atlanta, Ga.), is prepared by first blunging and dispersing an appropriate crude kaolin to form an aqueous dispersion of same. The blunged and dispersed aqueous slurry is subjected to a particle size separation from which there is recovered a slurry of the clay, which includes a very fine particle size; e.g. substantially all particles can be smaller than 1 micrometer E.S.D. The slurry is dried to produce a relatively moisture-free clay, which is then thoroughly pulverized to break up agglomerates. This material is then used as a feed to a calciner; such feed is calcined under carefully controlled conditions to typical temperatures of at least 900° C. The resulting product is cooled and pulverized to provide a pigment of the porous, high light scattering aggregates of kaolin platelets as described.

Calcined kaolins have also found use in paper coating applications. Reference may be had to the paper by Hollingsworth, Jones, and Bonney, "The Effect of Calcined Clays on the Printability of Coated Rotogravure and Offset Printing Papers", TAPPI Proceedings, pages 9-16, 1983 Coating Conference, discussing the advantages of incorporating small quantities of calcined kaolins into conventional kaolin-based coating formulations. Brightness and opacity of the paper both increase with increased calcined kaolin content, as may be expected from a pigment with high light scatter, and in some formulations gloss may show a slight increase with increasing calcined kaolin content.

Calcined kaolin products, including those of the aforementioned ALPHATEX® type, are seen to be manufactured by relatively complex techniques involving a multiplicity of steps, including specifically a calcining step, plus various preparatory steps and post-calcining steps. Thus, the said product is relatively expensive to produce; and requires considerable investment in complex apparatus and the like—e.g. highly regulated calciners, etc. It can indeed be noted that the conditions of preparation of these materials must be very carefully controlled in order to keep abrasion acceptably low in the calcined product. For example, the calcination operation tends per se to produce an abrasive product—in consequence of overheating—if great care is not taken to preclude such a result.

It is further to be noted that in order to produce a low abrasion calcined product, the particle size in the feed to the calciner must be carefully controlled—even a relatively small increase in coarseness of such feed can have very marked detrimental effect on Valley abrasion.

It has heretofore been known to utilize uncalcined (sometimes referred to as "hydrous")kaolin both as paper fillers and for paper coating. Because the uncalined material usually does not possess high light scattering qualities or good opacity, its usefulness, especially as a filler, is limited; and this (in addition to improving brightness) is indeed the particular advantage of calcined products of the ALPHATEX® type; i.e. by virtue of the aggregated structures of same, high light scattering properties are provided and good opacity.

With respect further to terminology, it is noted that the prior art literature, including numerous of the prior art patents relating to the field of kaolin products and processing, often uses the term "hydrous" to refer to a kaolin which has not been subjected to calcination—more specifically, which has not been subjected to temperatures above about 450° C., which temperatures serve to alter the basic crystal structure of kaolin. These so-called "hydrous" clays may havebeen produced from crude kaolins, which have been subjected to beneficiation, as, for example, to froth flotation, to magnetic separation, to mechanical delamination, grinding, or similar comminution, but not to the mentiond heating as would impair the crystal structure.

In an accurate technical sense, the description of these materials as "hydrous" is, however, incorrect. More specifically, there is no molecular water actually present in the kaolinite structure. Thus, although the composition can be (and often is) arbitrarily written in the form $2H_2O.Al_2O_3.2SiO_2$, it is now well-known that kaolinite is an aluminum hydroxide silicate of approximate composition $Al_2(OH)_4Si_2O_5$ (which equates to the hydrated formula just cited). Once the kaolin is subjected to calcination, which, for the purposes of this specification means being subjected to heating of 450° C.or higher for a period which eliminates the hydroxyl groups, the crystalline structure of the kaolinite is destroyed. Therefore, such material, having been thus calcined, cannot correctly be referred to as a "kaolin". Accordingly, it should be appreciated that henceforth in this specification, when the term "kaolin" or "kaolinite" is utilized, such term necessarily implies that the original structure of the materialis intact. Thus, the term "kaolin" as used herein, can be considered to be equivalent to the technically inaccurate (but oft-occurring) prior art usage, "hydrous kaolin" or sometimes simply "hydrous clay."

From time to time, it has been proposed to provide structured kaolin agglomerates by methods unrelated to calcining, the objective being to produce a high light scattering pigment, one with good opacifying properties, without the need for calcination.

Thus, in U.S. Pat. No. 4,346,178 to Peter Economou, a structured kaolin agglomerate is disclosed wherein the clay platelets are stabilized or frozen in position by the addition thereto of a urea-formaldehyde prepolymer.

Further relevant art includes U.S. Pat. No. 4,072,537 to F. L. Kurrle. Disclosed therein is a composite silicate pigment prepared by a precipitation reaction employing an aqueous suspension of clay particles wherein spherical hydrous metal silicate particles are precipitated on the planar surfaces of clay particles having a platelet-type structure. The metal silicate pigment component is comprisedof the reaction product of a water soluble alkali metal silicate such as sodium silicate and a water soluble salt of a polyvalent metal, such as calcium chloride.

This patent is significantly different from the present invention. For example:

(a) there is no change in the particle size of the starting clay;

(b) precipitation of spherical metal silicates is stated to occur;

(c) the process is aqueous and ionically driven, i.e., induced by using calcium ions; and (d) kaolinite is acting only as a support for spherical metal silicates.

In U.S. Pat. No. 2,296,637 to M. L. Hanahan, a sodium silicate was added to an aqueous suspension of a paper coating clay, acidified to a pH of 6 to precipitate a gel-like coating on the clay, and the suspension was filtered and dried. The process of this patent is not aggregation in the true sense, but precipitation of silica gel on a kaolinite surface, which is done prior to spray drying. It should be noted that extensive pulverization is required to disintegrate hard aggregates formed by such precipitation method. According to the patent, powder brightness increases with silicate precipitation, clearly showing the differences in the process thereof as compared with the subject aggregation method.

In U.S. Pat. Nos. 3,853,574; 3,874,140; and 3,856,545, all to Thomas H. Ferrigno, pigmentary compositions are disclosed wherein comminuted mineals such as kaolins are combined with inorganic binders such as an alkaline metal silicate, and formed into agglomerates, which when calcined produce compositions embodying numerous particles of the minerals bonded together and presenting internal voids and multiple light reflecting surfaces. The resulting pigmentary compositions are useful in applications requiring high visible light reflectance. These products, however, are, as indicated, produced by calcining.

In accordance with the foregoing, it may be regarded as an object of the present invention, to provide a structured kaolin pigment product, which possesses improved light scattering characteristics, and hence is useful as an opacifier and light scattering filler for paper and paper products, and which may similarly be used in other paper manufacturing applications, including in the coating of same.

It is also an object of the invention to provide improved coated paper and paperboard products for printing purposes such as for offset printing, gravure printing and other types of printing, using a structured kaolin pigment.

It is a further object of the present invention, to provide a pigment product of the foregoing character, which is prepared without calcination and therefore without subjecting the kaolin to high tempearatures, and which accordingly possesses low abrasiveness in accordance with the kaolin feed from which it is produced.

It is a yet further object of the invention, to provide a pigmentary product of the foregoing character, which is composed of structured aggregates of minute kaolin particles which are bonded together chemically, i.e. without the use of calcination or other high temperature techniques.

It is a still further object of the invention to provide a high light scattering pigmentary kaolin product, which may be produced at lower costs than calcined kaolins, and which can therefore provide a lower cost replacement for many applications in which calcined kaolin products or other high cost fillers are presently utilized.

It is a yet further object of the invention, to provide a process for producing a pigmentary high light scattering kaolin product, which process utilizes chemical aggregation techniques, and may be carried out without the use of a calcining step or of other high temperature processing conditions or equipment.

It is a yet further object of the present invention, to provide a process for producing structured kaolin pigments as aforementioned, which consists of a minimal number of simply conducted steps, which utilize relatively simple and inexpensive apparatus, and which introduce minimal foreign elements into the final product produced by same.

A still further object of the invention is to provide a process for producing structured kaolin pigments as aforementioned, from a feed crude containinghigh percentages of extremely minute particles, e.g., less than 0.25 micrometers, to thereby convert a crude having limited value to the paper maker to one which can be readily and economically used in paper products.

A yet further object of the invention, is to provide a process as aforementiond, which enables low abrasion structured kaolin pigments to be produced from coarser process feeds than can normally be employed in calcination to produce a product of comparable low abrasion.

It is a further object of the invention to provide bulky structured kaolin pigments which are eminently suitable for paper coating applications.

As disclosed in U.S. Ser. No. 918,632, filed Oct. 14, 1986, a fine particle size kaolin feed is reacted in particulate form with a metal chloride, such as silicon tetrachloride, to form a chemically aggregated structured kaolin pigment. Free moisture present in the particulate feed is sufficient to initiate at least a partial hydrolysis of the metal chloride or chlorides. If the moisturelevel is too high, however, it can diminish or impair the efficiency of the aggregation process. Thus in the instances where silicon and/or titanium chlorides are used, if the moisture level is too high relative to the metal chloride(s), then the hydrolysis products from the metal chlorides will predominantly precipitate as the metal oxide, i.e. as silica gel and/or titania. In the case of aluminum trichloride, if the moisture level is too high relative to the metal chloride, then the dilution of the finally resulting aluminum hydroxide (in the presence of ammonia) can be so high as to cause inefficient aggregation. In the instance of the silicon and titanium chlorides, the water to metal chloride molar ratio should be at least 0.23, and generally less than about 50, with from about 1 to 10 being a preferable molar ratio range. Where aluminum trichloride is used the lower limits of moisture are as indicated for silicon and titanium chloride; the upper limits in this case are not critical, except that when moisture level is greater than about 10% by weight of the feed, (corresponding to a water to metal chloride molar ratio of about 8.2), processing as a dry product becomes increasingly difficult, and can necessitate additional drying steps. The indicated steps are conducted under conditions such that the basic kaolinite crystalline structure (as determined by X-ray or electron diffraction) is not altered—i.e. the kaolinite is not rendered substantially amorphous, as occurs in conventional high temperature calcining as described for example in the aforementioned McConnell et al, Proctor, and Fanselow et al patents. In a further aspect, ammonia is desirably added at addition levels of from about 8 to 16 pounds per ton of the feed mixture, the ammonia being added to the previously combined kaolin and metal chloride.

In said application (also in PCT application PCT/US86/00158, see page 27, published under the number WO87/00544 on Jan. 29, 1987, based on U.S. Ser. Nos. 754,475 and 802,843), it was hypothesized that the effectiveness of that invention partially may result from the hydrolysis of the silicon tetrachloride, which leads to monosilicic acid, which either reacts with the kaolin surface immediately or polymerizes and then reacts with the kaolin particles. However, the immediate reaction was thought to be more likely. Addition of ammonia helps to neutralize the acid resulting from the above, first indicated reaction, and enhances the condensation reactions of the monosilicic acid. The ammonia can also form silicon-amine type polymers, which would further enhance and bond the particles. Enhancement of the said process is effected by the addition of an enhancing agent metal ion, believed to result in the formation of metal silicates, which function as binding agents, yielding stronger aggregates, and which also helps to neutralize the acidic by-products.

Thus, in said application the aggregation of fine kaolinite is caused to occur when treated with silicon tetrachloride. These micron size, bulky aggregates are used to improve the surface properties of coated paper and the opacity of filled paper.

SUMMARY OF THE INVENTION

In one aspect of the present invention, similar bulky, micron size aggregates of fine kaolinite mineral are achieved by treatment of the substantially dry substrate with aqueous silicate, followed by drying, pulverizing and exposure to an acidic gas. The time of treatment with the acidic gas suitably may vary from about 5 to about 15 minutes. The silicate is suitably an alkali metal, e.g., sodium silicate. The silicate solution should have a pH in the range of about 11 to about 14, preferably about 11.8. The amount of silicate based on the weight of the dry clay will be in the range of about 0.25 weight % to about 5.0 weight %. When using a 40% active aqueous sodium silicate, the amounts of this silicate solution will be in the range of about 0.62 weight % to about 12.5 weight % based on the weight of dry clay.

The ratios of $SiO_2/Na_2O$ of the sodium silicate can be varied in the range of 1.25 to 3.8; however, the preferred ratio is 1.25.

The pH of the final product, measured as a 20% slurry in water, will be in the range of about 2 to 6.5.

By the process of this invention, the steps such as filtration, washing and extensive grinding applied in U.S. Pat. Nos. 4,072,537 and 2,296,637 and eliminated, providing economic advantages. Also, in contrast to U.S. Pat. No. 4,072,537, in this invention no metal silicates are deposited on the surface of the kaolinite. It should be noted tha U.S. Pat. No. 4,072,537 asserts no change in the particle size of the kaolinite attributed to the deposition of metal silicate. In the present invention, there is a characteristic change in the particle size. This change in particle size can be attributed to the result of chemical bonding occurring in this chemical aggregation process.

In a further aspect of the invention, it is preferable to intermix with the kaolin feed, small quantities of an aggregation enhancing agent. Such agent is selected from one or more members of the group consisting of the alkaline earth metal carbonates, chlorides or hydroxides, or lithium carbonate.

The aggregation enhancing agent mixed with the kaolin preferably should provide from about 15 to 120 millimoles of alkaline earth metal or lithium ions per 100 parts by weigh of kaolin. This equates to from about 0.5 to 12% by weight kaolin of a particulate alkaline earth metal carbonate or hydroxide or lithium carbonate. Where the particularly preferred calcium carbonate or hydroxide are used, a more preferable addition range is from about 1.5 to 4% by weight of kaolin.

The kaolin utilized as a feed for the invention, can be the product of kaolin wet processing, wherein various conventional beneficiation steps known to kaolin wet processing are utilized; or in accordance with a further aspect of the invention, the kaolin can be the product of air classifying a kaolin crude, preferably to at least 88% less than two micrometers—depending upon the light scattering characteristics desired in the final product; except that where the product of the invention is to be used in coating formulations, the classification is preferably to at least 94% less than 2 micrometers.

The aggregated products of the invention are found to have a pore volume which is higher than the feed kaolin used to form same, although lower than a calcined kaolin formed from the same feed. The pore void volumes of products of the present invention when prepared from fine particle size feeds are found to range from 0.35 to 0.5 cm$^3$/g.

The process of the invention, very importantly, serves to aggregate the very fine particles (i.e. the sub 0.25 micrometer particles) present in very fine feeds of the type heretofore discussed. These minute particles can indeed serve in the aggregates as bridges between larger (e.g. micrometer-sized) particles to which they are chemically bonded. Thus, one important advantage to the paper manufacturer is that the otherwise large percentages of troublesome extremely fine particles have been effectively removed as separate entities, but without the need for separation steps, together with the costly equipment required for such operations.

When used in paper coating applications, the structured kaolin pigments of the invention comprise from about 5 to 60% and preferably from about 10 to 30% by weight of the total pigment component of the coating composition. The balance of the pigment can comprise any of the known coating pigments, such as coating grades of kaolins, calcium carbonate, titanium dioxide, plastic pigments, etc. The coating compositions, in addition to the pigment component, include conventional components, such as an adhesive binder, dispersants, and other known additives.

Where the structured kaolin pigments are used in the coating of paper as aforementioned, it has been found that the increase in gloss in the resultant coated papers, is in part a function of the particle size characteristics of the feed kaolin used to prepare the structured kaolin pigments. Thus, too coarse a feed can be undesirable in these instances. The said feed should preferably be at least 94% less than 2 micrometers E.S.D.

As far as theory is concerned, the following may be considered. Typically, an aqueous sodium silicate solution is stable only above a pH of 10. Any attempt to lower the pH tends to bring about the formation and rapid crystallization of amorphous silica gel. This is a hard, sandy type gel, that is, hard and abrasive when dry and of extremely coarse particle size. Further, the gel is thick and heavy and difficult to pulverize by grinding. Consequently it is not a material having properties suitable in the preparation of fillers or coatings for paper. However, if the silicate solution is extremely dilute, the pH can be lowered without precipitation/-formation of silica gel (with, however, the disadvantages of requiring extensive drying and increasing the risk of high residue). In this condition it is believed to form monosilicic acid, a precursor to silica gel. Three to five unit oligomers of this material can be considered to be a microsol, e.g., a submicron size silica sol. It is desirable to react such a microsol on the surface of the clay. The particles thereof have a high free energy so that they are very reactive towards the clay particles and to each other. Thus, if monosilic acid or its obligomer (no higher than five monomer units) is permitted to react with the hydroxyl groups of kaolinite, it would lead to aggregation. The aggregated product should behave similarly to that produced with silicon tetrachloride.

It should be noted that in the present process the pH of the silicate solution is not reduced, thus there is no silica gel precipitation, which is unwanted.

The function of the acidic gas, e.g., HCl, is to initiate formation of monosilicic acid and insolubilize polysilicic acid forming on the surface. In the proposed mechanisms, bonding would occur only if there is formation of monosilicic acid. Thus the HCl is vital to the process, without which aggregation could not occur. The formation of a microsol is caused by the reaction of surface deposited silicate on contact with the HCl gas.

DETAILED DESCRIPTION

The invention is further illustrated by the following examples, which are to be regarded as only illustrative of the present invention, and not delimitive thereof:

EXAMPLE I

A blend of two fine North Eastern Georgia kaolin clays was refined according to conventional procedures. The refined clay was wet classified to 94% less than 2 micrometer E.S.D. The refined clay was flocculated with aluminum sulfate and sulfuric acid. The flocculated clay was filtered and redispersed using sodium polyacrylate and sodium hydroxide. The redispersed clay was spray dried by conventional technique and pulverized using a pulverizer, product of Mikropul Corporation. The pulverized clay was blended in a high shear Waring blender with 2.5% by weight, based on clay, of aqueous sodium silicate (40% active) supplied by Chemical Products Corporation of Cartersville, Ga., marketed by the trade name of ChemSilate. The clay was dried at 150° C. for fifteen minutes and once again pulverized. This clay was exposed to moist HCl gas by bubbling nitrogen (carrier gas) through concentrated (12M) HCl solution, under static pressure of one atmosphere. No agitation was applied. HCl exposure was continued until the pH of the product measured as a 20% slurry in water was 6.0 to 6.5, which required about 5 minutes. The final product was flushed with air to remove excess HCl.

Figure 1:
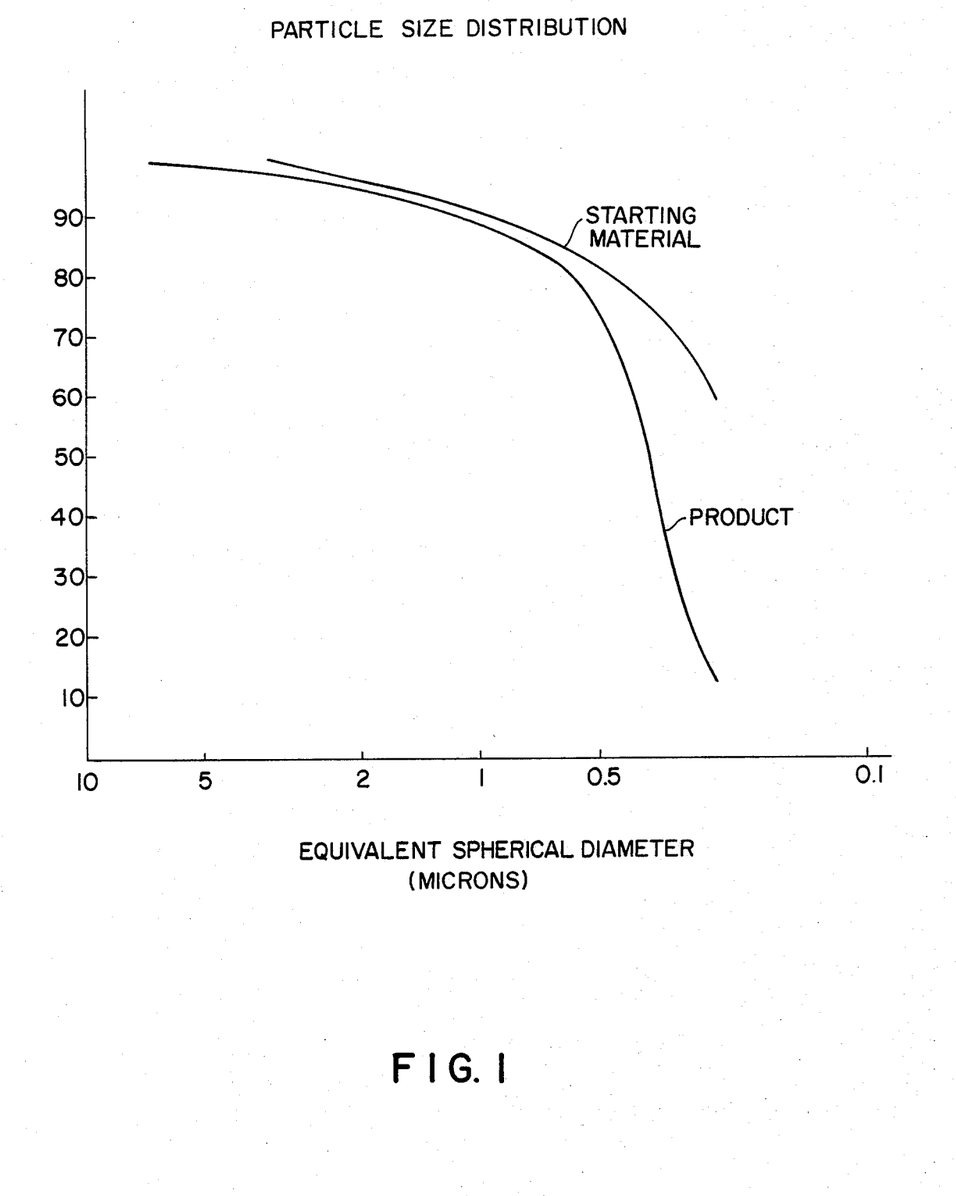
FIG. 1 shows the particle size distribution of an untreated kaolin, labeled "starting material" versus the kaolin treated in accordance with the invention, labeled "product"

The aggregation leads to a product of extremely narrow particle size distribution (PSD) with increased pore volume as shown in FIG. 1.

Figure 2:
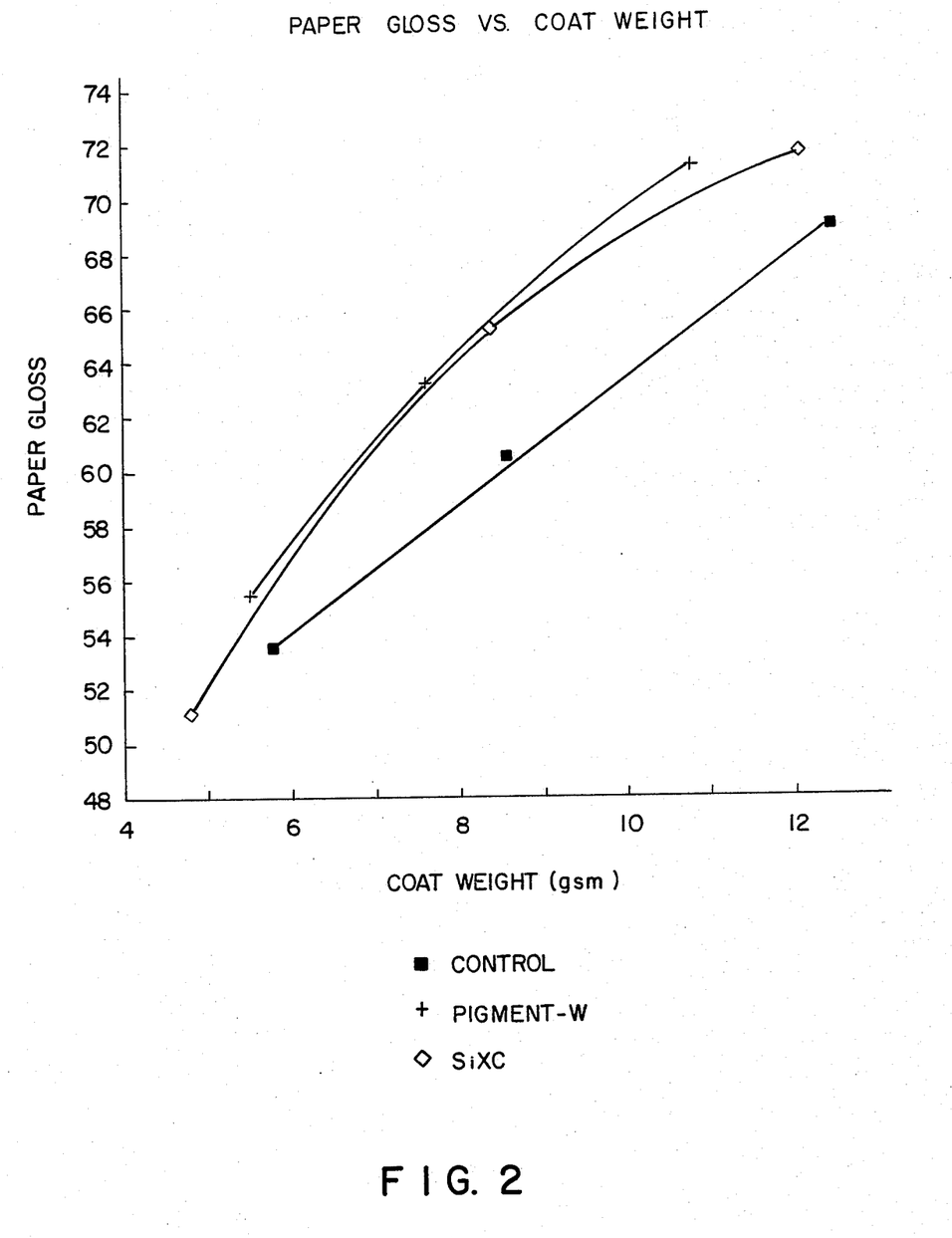
FIG. 2 illustrates the paper gloss properties of the product of the invention when used in a paper coating.
Figure 3:
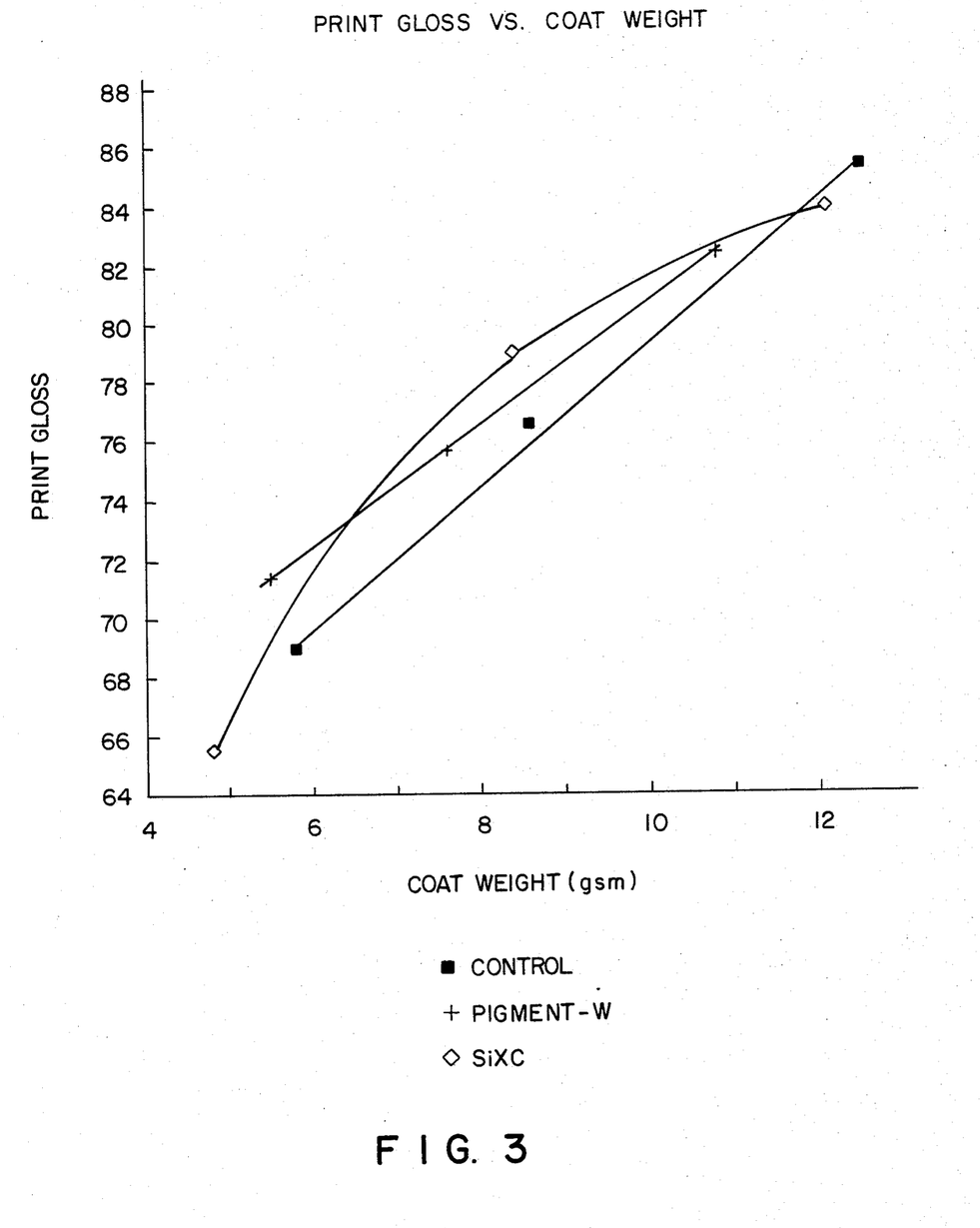
FIG. 3 illustrates the printability advantage, print gloss properties of the product of the invention when used in a paper coating.
Figure 4:
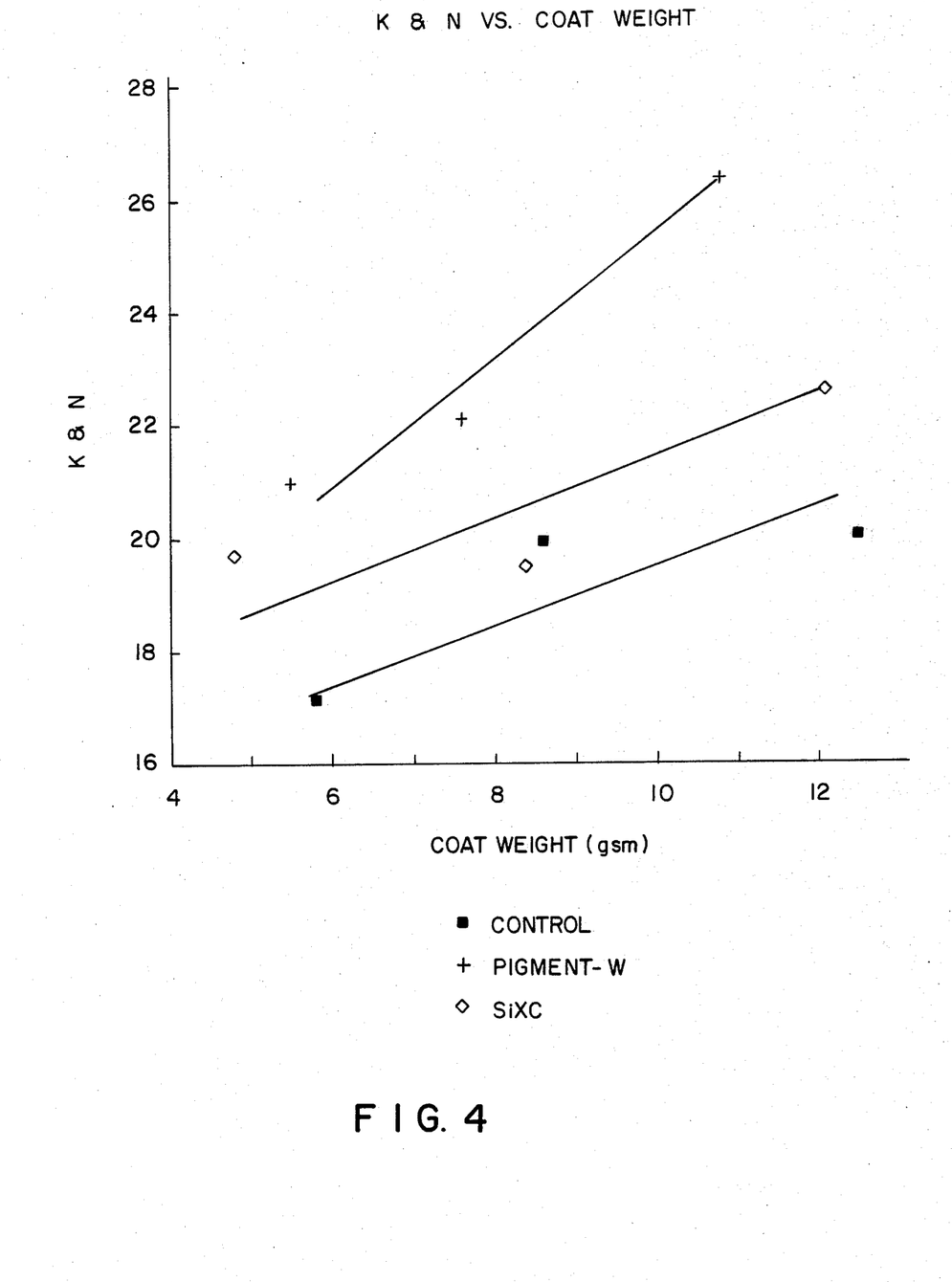
FIG. 4 shows the bulky openness of the coated sheet as measured by K and N ink absorption.

The product was tested in paper coating using a standard offset formulation. The results of coated sheet properties are provided in Table 1. Table 1 provides comparative data. In column A the pigment used in the coating formulation was a mixture of 75% fine #1 coating kaolin clay and 25% Carbital 90, a calcium carbonate product having a particle size distribution such that 90% thereof by weight are less than 2 microns E.S.D., supplied by Atlantic Carbonates of Baltimore, Md. In column B, 60% of #1 coating clay was used, 10% of Carbital 90 and 30% of pigment W prepared by treatment of a kaolin clay having a PSD of 96% less than 2 micrometers E.S.D., with silicon tetrachloride followed by ammonia (see the aforementioned PCT application). In column C, pigment W was replaced by pigment SiXC which designates the pigment according to the invention prepared as just described above. It should be noted (compare column C with column B) that the improvement in surface coverage (paper gloss and print gloss) is equivalent to a product prepared using silicon tetrachloride. FIGS. 2 and 3 further illustrate the paper gloss and printability of the coated paper, column C. FIG. 4 further illustrates that the use of Pigment SiXC also provides an open coating to improve ink receptivity, as measured by the K and N ink receptivity test.

TABLE 1

Properties of Paper Coated with Silicate Aggregated Kaolinite Pigments

| Properties | A<br>75% #1 Clay<br>25% Carbital 90 | B<br>60% #1 Clay<br>10% Carbital 90<br>30% Pigment W | C<br>60% #1 Clay<br>10% Carbital 90<br>30% Pigment SiXC |
|---|---|---|---|
| Brightness | 71.3 | 71.9 | 71.3 |
| Opacity | 90.7 | 91.2 | 90.6 |
| Gloss | 59.0 | 64.5 | 64.0 |
| Print Gloss | 75.0 | 76.6 | 77.9 |
| Litho P. Gloss | 61.6 | 68.7 | 64.5 |
| Print Density | 1.78 | 1.72 | 1.73 |
| Litho P. Density | 1.33 | 1.38 | 1.30 |
| P. Density Ratio | 0.75 | 0.80 | 0.75 |
| K & N | 18.6 | 23.2 | 20.4 |

EXAMPLE II

The general preparation of the feed clay and chemical treatments were similar to those described in Example I, except that the feed clays were reacted with varying amounts of the silicate solution, i.e., from 0.6 weight % to 12.5 weight %. The particle size distribution analysis indicated that aggregation occurs even when using 0.6 weight % silicate solution; however, the product with the most preferred properties was obtained when a 2.5 weight % silicate solution was used.

EXAMPLE III

A series of clays was prepared by treating a feed clay, prepared as described in Example I, with 2.5% by weight of sodium silicate solutions of varying $SiO_2/Na_2O$ ratios, which ranged from 1.25 to 3.8. The above clays were pulverized and dried to 0.8% moisture. These clays were exposed to moist hydrochloric gas to form and polymerize silicic acid. The reaction was allowed to proceed for about five to fifteen minutes, until the pH reached 6 to 6.5. The excess gas was vented and the product was either dried in air or at 150° C. for fifteen minutes. The pore void volume measurements and particle size distribution indicated that although aggregation was achieved with each of these silicates, the product of highest pore void volume was obtained with the silicate having a $SiO_2/Na_2O$ ratio of 1.25. At a $SiO_2/Na_2O$ ratio of higher than 2.5, the product tends to exhibit undesired bimodal pore size distribution.

EXAMPLE IV

The general preparation of the feed clay was similar to that described in Example I. The amount of silicate solution used was identical to that used in Example I. Pulverized clay was this time treated with anhydrous HCl gas. The pH of the product was 2.5. The light scatter results of filled hand sheets indicated that the use of anhydrous HCl gas provides a pigment of higher light scatter coefficient, thus the preferred mode of silicate condensation is use of anhydrous HCl gas, see Table 2.

TABLE 2

Effect of Dry vs. Moist Hydrochloric Acid
On Normalized Light Scatter of Pigment SiXC

| Pigment | Normalized Light Scatter at 10% Filler Loading |
| --- | --- |
| Feed Clay | 485 |
| Pigment SiXC Using Moist HCl | 521 |
| Pigment SiXC Using Dry HCl | 535 |

EXAMPLE V

The initial steps of feed clay preparation, i.e. degritting, refining and size classification, were similar to Example I. However, the classified clay was first dosed with 2.5% by weight, based on dry clay, of the sodium silicate solution prior to spray drying. The dry clay was then pulverized and reacted with dry HCl gas as described in Example IV. This process provides aggregated clay of similar opacifying properties as obtained with the dry addition process. Table 3, however, shows that the final product may be contaminated with a higher than desirable amount of 325 mesh residue.

TABLE 3

The Point of Sodium Silicate Solution
Addition and Its Effect on
Light Scatter and 325 Mesh Residue

| Pigment | Normalized Light Scatter at 10% Filler Loading | Percent 325 Mesh Residue |
| --- | --- | --- |
| Feed Clay | 490 | <0.001 |
| Pigment SiXC Silicate Solution Added Before Spray Drying of Feed Clay | 521 | 0.5 |
| Pigment SiXC Silicate Solution Added After Spray Drying of Feed Clay | 526 | 0.05 |

EXAMPLE VI

Figure 5:
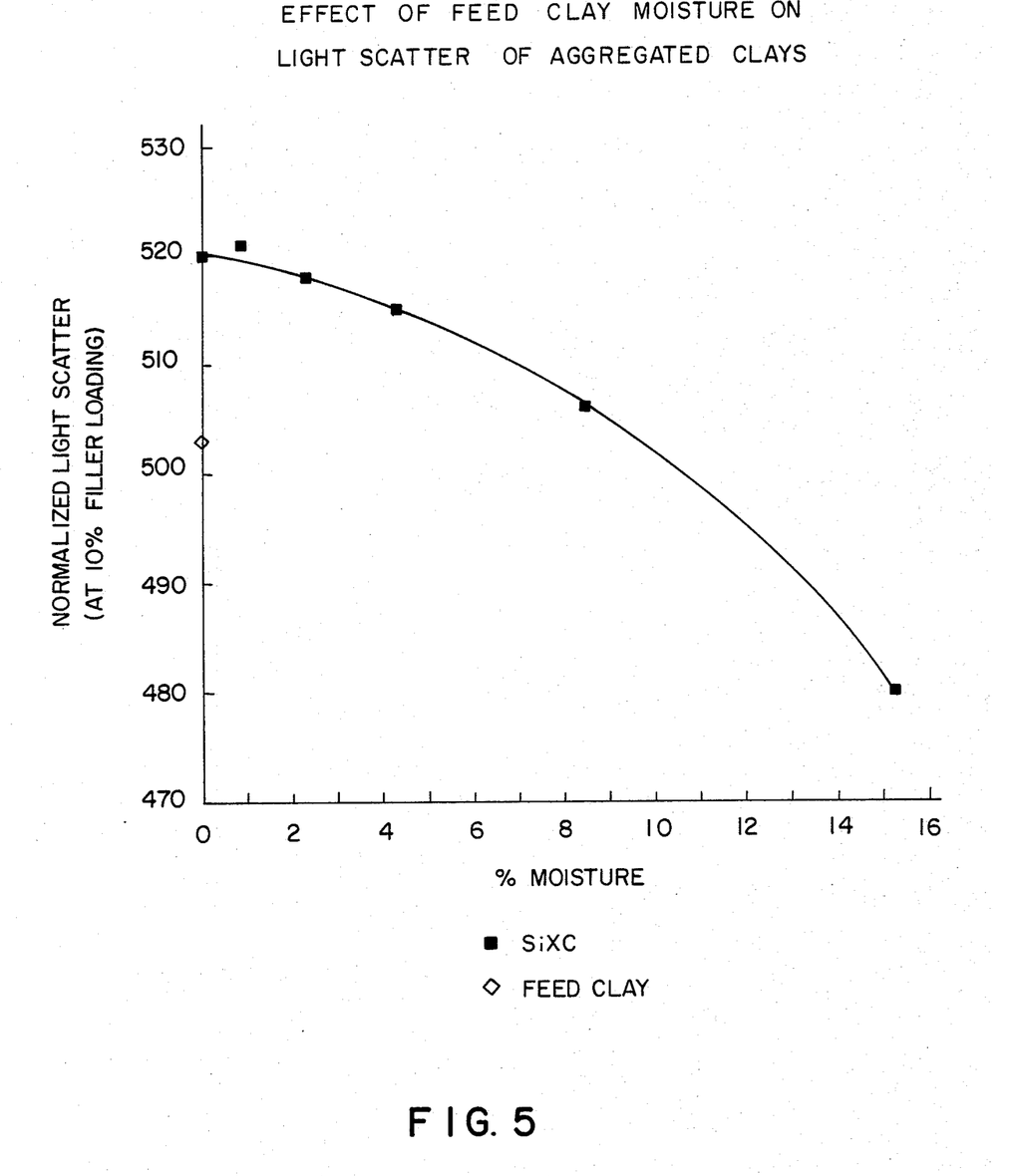
FIG. 5 illustrates the effect of feed moisture on the light scattering ability of the product of the present invention.

The rate and extent of monosilicic acid polymerization depends on the construction and the mobility of the molecules. In the liquid state, the mobility of such species would be several orders of magnitude higher than in the dry state. Thus, the amount of moisture available on the claiy surface would have a significant effect on the final properties of silicate aggregated clays. A series of samples was prepared by taking a stock sample of the feed clay to the HCl treating step, as prepared in Example I, and blending it with the required amount of water to achieve moisture levels of 0.05, 2.3, 4.3, 8.5 and 15.3. These clays were then rapidly exposed to dry HCl gas, as in Example IV. The final product clearly shows reduction in opacifying power of aggregated clay at higher moisture, see FIG. 5.

EXAMPLE VII

A series of samples was prepared by blending the feed clay with 0.6 to 12.5% by weight of sodium silicate solution ($SiO_2/Na_2O = 1.25$) followed by pulverization and reaction with anhydrous hydrochloric acid. The particle size distribution and pore void volume measurements indicated that aggregation is accomplished with a very small amount of silicate; the preferred amount is 2.5 weight % of a 40% active sodium silicate solution.

EXAMPLE VIII

Figure 6:
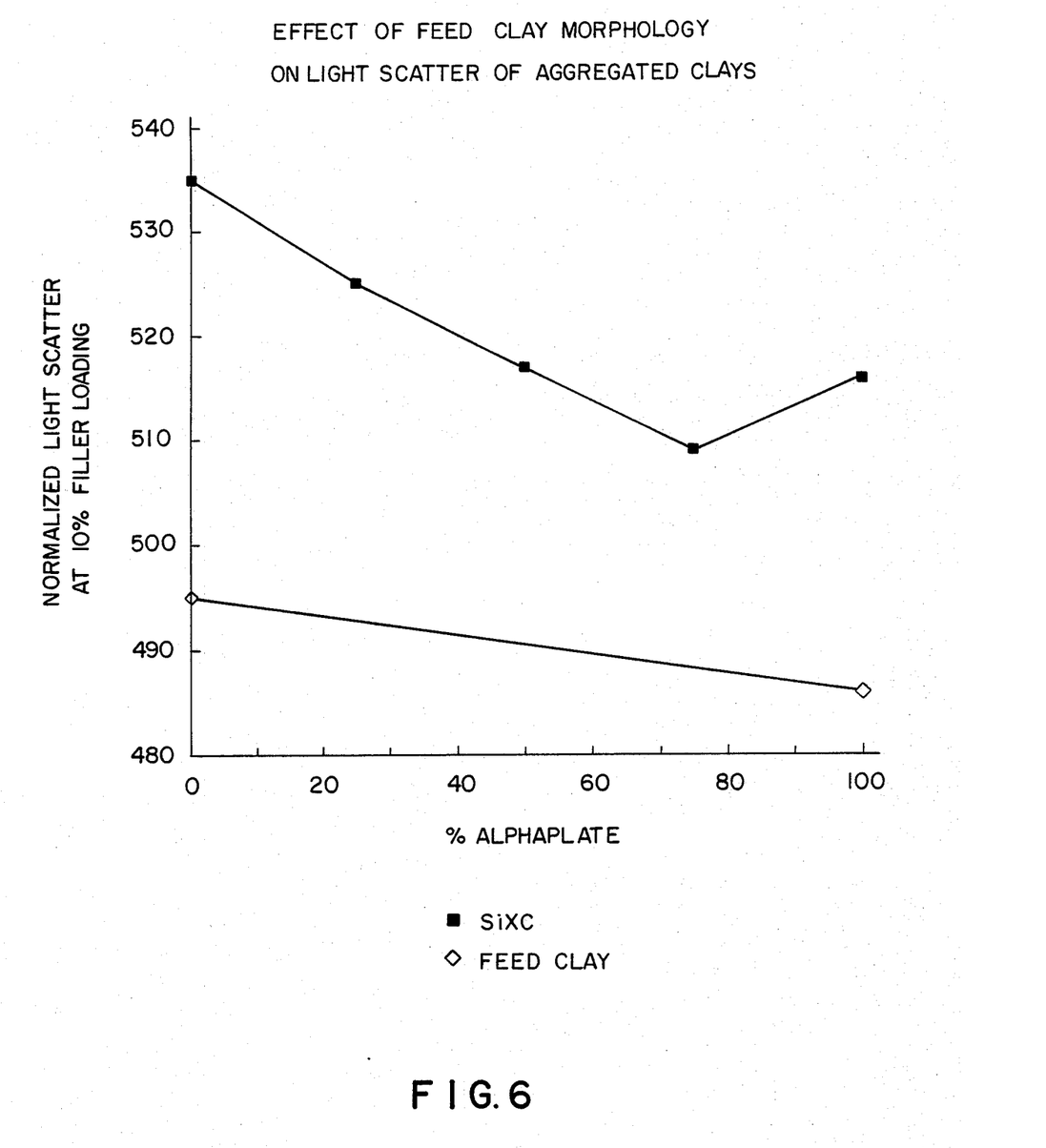
FIG. 6 shows the effect of feed particle morphology on the light scattering ability of the product of the presnt invention.

This invention describes the method of clay particle aggregation by a chemical method. Such reaction would depend not only on the size fraction of the feed clay but also on the shape of the feed clay. In a series of experiments, the shape factor of the feed clays was varied by mixing beneficiated and classified slurries of a fine but chunky clay, with coarse, highly laminated clay, to that the ratios of fine clay to laminated clay were in the range of 0.0 to 1.0. The blend slurry was followed by spray drying and pulverizaion. These feeds were then reacted with 2.5 weight % sodium silicate solution (40% active) as described in Example I. The clays were then reacted with anhydrous HCl gas as in Example IV. The pore void volume increases with the amount of coarse, platey clay (Alpha-plate) but opacifying power, as determined by light scatter, increases with fine feed clay, see FIG. 6.

EXAMPLE IX

The general preparation of feed clay was similar to Example I, except that the redispersed clay was treated with 4.4 weight % calcium chloride dihydrate salt (supplied by Aldrich Chemical Co.) prior to spray drying. Calcium chloride was added as a 2.0M solution. After spray drying and pulverization, this clay was blended with 2.5 weight % sodium silicate solution (40% active). The resulting clay was dried and pulverized. The moisture of the clay was 0.85% by weight. The dry, pulverized clay was exposed to anhydrous hydrochloric acid according to Example IV. The light scatter results show 5% improvement over feed clay without calcium chloride.

EXAMPLE X

The general preparation of the feed clay was similar to that described in Example I, except that the redispersed clay was treated with 3% ground calciumcarbonate prior to spray drying. The pulverization and chemical treatment following spray drying was similar to that in Example IX. The product is an aggregated clay with an extremely narrow particle size distribution. The pH of the product was 2.5. The light scatter of this product was 10 units higher than the product of a feed clay containing no ground calcium carbonate.

EXAMPLE XI

The chemicals and process used were similar to Example X, except that this time 3% ground calcium carbonate was added after spray drying of the feed clay. The light scatter of this product is similar to that where calcium carbonate was added prior to spray drying of the feed clay.

EXAMPLE XII

The general feed clay preparation was similar to Example X. The pulverization and chemical treatment following spray drying were similar to Example I where moist hydrochloric acid gas was used. The particle size distribution of the product was similar to the product described in Example X.

EXAMPLE XIII

The feed clay and the process of aggregation were similar to Example IV, except that this time residual hydrochloric acid was neutralized with anhydrous ammonia so that the final pH of the product would be 7.0 to 7.5. The pore void volume measurement indicated improved aggregation upon neutralization of hydrochloric acid with gaseous ammonia.

EXAMPLE XIV

The general procedure for feed clay preparation was similar to Example XI, except this time 2.22 weight % calcium hydroxide powder (supplied by J. T. Baker Chemical Co.) was added to the spray dried feed clay. The aggregation process with sodium silicate and hydrochloric acid was identical to that in Example XI. The light scatter of this prduct was similar to the product of Example IX.

EXAMPLE XV

The general feed clay preparation and pulverization were similar to those described in Example X. The treatment of the pulverized feed clay with 2.5 weight % sodium silicate solution followed by HCl gas and ammonia gas treatment were identical to those in Example XIII. The light scatter of this product was about 25 units higher than the feed clay. The chemical treatment leads to an improvement in pore void volume from 0.22 $cm^3/g$ to 0.41 $cm^3/g$.

EXAMPLE XVI

The feed clay was prepared by a dry, air classification method. The crude clay was dried to moisture less than 0.5% by weight. The dried clay was pulverized and air classified to 92-94% less than 2 micrometer. The subsequent chemical aggregation treatment was similar to that in Example IV. Particle size distribution indicated aggregation of fine particles to provide a product of narrow particle size distribution with increased pore void volume.

While the present invention has been particularly set forth in terms of specificembodiments thereof, it will be understood in view of the instant disclosure, that numerous variations upon the invention are now enabled to those skilled in the art, which variations yet reside within the scope of the present teaching. Accordingly, the invention is to be broadly construed, and limitedonly by the scope and spirit of the claims now appended hereto.

What is claimed is:

1. A process for producing a structured aggregated kaolin pigment useful for improving optical properties when incorporated in paper which comprises the steps of mixing a substantially dry kaolin in particulate form with an aqueous alkali metal silicate to deposit on the surface of the kaolin particles a molecular level of silicate without formation of a silica gel, drying the treated kaolin and exposing it to an acidic gas.

2. The process as set forth in claim 1 in which the pH of the aqueous alkali metal silicate is in the range of about 11 to about 14.

3. The process as set forth in claim 2 in which the pH of the final product, measured as a 20% slurry in water, is in the range of about 2 to about 6.5.

4. The process as set forth in claim 1 in which the amount of silicate used is in the range of about 0.25 weight % to about 5.0 weight % based on the weight of dry clay.

5. The process as set forth in claim 1 in which about 0.62 weight % to about 12.5 weight % of a 40% active aqueous sodium silicate is used based on the weight of dry clay.

6. The process as set forth in claim 1 in which the acidic gas is HCl.

7. The process as set forth in claim 1 in which the acidic gas is moist HCl gas carried by an inert gas.

8. The process as set forth in claim 1 in which the acidic gas is anhydrous HCl.

9. The process as set forth in claim 1 in which residual HCl gas is neutralized with anhydrous gaseous ammonia.

10. The process as set forth in claim 1 in which the drying step is carried out below calcining temperature.

11. The process as set forth in claim 10 in which the drying step is carried out at temperatures not above 300° C.

12. The process as set forth in claim 1 in which the feed kaolin has a particle size distribution of at least 94% less than 2 micrometers E.S.D.

13. The process as set forth in claim 1 in which the feed clay is mixed with an aggregation enhancing agent selected from the group consistingof alkaline earth metal carbonates, chlorides or hydroxides, or lithium carbonate.

14. The process as set forth in claim 13 in which the aggregation enhancing agent is calcium carbonate.

15. The process as set forth in claim 13 in which the aggregation enhancing agent is calcium chloride and is added prior to the spray drying of the feed clay.

16. The process as set forth in claim 13 in which the aggregation enhancing agent is calcium chloride and is blended in after spray drying of the feed clay.

17. The process as set forth in claim 13 in which the aggregation enhancing agent is calcium hydroxide and is added after spray drying of the feed clay.

18. The process as set forth in claim 13 in which the aggregation enhancing agent is present in quantities to provide from about 5 to 120 millimoles of the enhancing agent metal ion species per 100 parts by weight of kaolin.

19. A process of coating paper which comprises employing as a coating pigment in a coating composition a structured aggregated kaolin prepared by mixing a substantially dry kaolin having a particle size distribution of at least 94% less than 2 micrometers E.S.D. with an aqueous alkali metal silicate to deposit on the surface of the kaolin particles a molecular layer of silicate without formation of a silica gel, drying the treated kaolin and exposing it to an acidic gas.

20. The method as set forth in claim 19 in which the acidic gas is HCl.

21. The method as set forth in claim 19 in which the treated kaolin pigment is used in an amount of about 5% to about 60% by weight of total pigment employed in the coating composition.

22. The process as set forth in claim 1 in which the aqueous alkali metal silicate has a ratio of $SiO_2/Na_2O$ in the range of 1.25 to 3.8.

23. The process as set forth in claim 22 in which said ratio is about 1.25.

24. The process as set forth in claim 1 in which the moisture of the feed clay to the acidic gas treating step does not exceed 7 weight %.

25. The process as set forth in claim 1 in which the feed clay is prepared by air classification.

26. A process for producing a structured aggregated kaolin pigment useful for improving optical properties when incorporated in paper which comprises the steps of mixing an aqueous suspension of a particulate kaolin clay with an aqueous alkali metal silicate without formation of a silica gel, spray drying, and exposing the particulate kaolin clay to an acidic gas.

* * * * *